US012732385B2

(12) United States Patent
Imai et al.

(10) Patent No.: US 12,732,385 B2
(45) Date of Patent: Sep. 8, 2026

(54) AUTHENTICATION SYSTEM, AUTHENTICATION MODULE, AND AUTHENTICATION PROGRAM

(71) Applicants: Giga System, Inc., Osaka (JP); SuccessKnowledge, LLC., Kanagawa (JP)

(72) Inventors: Kazuho Imai, Osaka (JP); Shigetomo Tamai, Yokohama (JP)

(73) Assignees: Giga System, Inc., Osaka (JP); SuccessKnowledge, LLC., Kanagawa (JP)

( * ) Notice: Subject to any disclaimer, the term of this patent is extended or adjusted under 35 U.S.C. 154(b) by 0 days.

(21) Appl. No.: 18/833,272

(22) PCT Filed: Jan. 24, 2023

(86) PCT No.: PCT/JP2023/002085

§ 371 (c)(1),
(2) Date: Jul. 25, 2024

(87) PCT Pub. No.: WO2023/145729

PCT Pub. Date: Aug. 3, 2023

(65) Prior Publication Data

US 2025/0112792 A1 Apr. 3, 2025

(30) Foreign Application Priority Data

Jan. 28, 2022 (JP) ................................. 2022-011604

(51) Int. Cl.
*H04L 29/06* (2006.01)
*H04L 9/06* (2006.01)
(Continued)

(52) U.S. Cl.
CPC .......... *H04L 9/3271* (2013.01); *H04L 9/0643* (2013.01); *H04L 9/0869* (2013.01)

(58) Field of Classification Search
None
See application file for complete search history.

(56) References Cited

U.S. PATENT DOCUMENTS 8,074,072 B2 12/2011 Brown et al.
8,590,024 B2 11/2013 Sims et al.
(Continued)

FOREIGN PATENT DOCUMENTS

JP 2020181337 A * 11/2020
JP 2021-150681 A 9/2021
(Continued)

OTHER PUBLICATIONS

International Preliminary Report On Patentability (Chapter I) and Written Opinion of the International Searching Authority issued in PCT/JP2023/002085; issued Jul. 30, 2024.
(Continued)

*Primary Examiner* — Andrew J Steinle
(74) *Attorney, Agent, or Firm* — Studebaker Brackett PLLC

(57) ABSTRACT

In an example of the present disclosure, a first authentication module acquires first authentication data in which first authentication information generated based on first identification information specific to the first authentication module and second identification information specific to a second authentication module and second authentication information generated based on the first authentication information, the first identification information and the second identification information are associated with each other. The second authentication module acquires second authentication data having the same configuration as the first authentication data. The first authentication module sends the first authentication information to the second authentication module, generates third authentication information as reference information, and, when send-back information
(Continued)

111A ,121A

| OID | OPW |
|---|---|

(the third authentication information or encrypted third authentication information) is received from the second authentication module, performs authentication by comparing the send-back information and the reference information or comparing decrypted send-back information and the reference information, and determines whether or not to continue a communication session with the second authentication module based on a result of the authentication.

20 Claims, 4 Drawing Sheets

(51) Int. Cl.
*H04L 9/08* (2006.01)
*H04L 9/32* (2006.01)

(56) References Cited

U.S. PATENT DOCUMENTS 10,742,418 B2 8/2020 Zhang et al.
11,228,442 B2 1/2022 Zhang et al.
2009/0249069 A1 10/2009 Daskalopoulos et al.
2017/0006026 A1 * 1/2017 An .......................... H04L 63/10

FOREIGN PATENT DOCUMENTS

KR 101572111 B1 * 11/2015 ......... H04L 63/0838
WO 2018/040758 A1 3/2018

OTHER PUBLICATIONS

International Search Report issued in PCT/JP2023/002085; mailed Mar. 28, 2023.

The extended European search report issued by the European Patent Office on Oct. 14, 2025, which corresponds to European Patent Application No. 23746940.8-1218 and is related to U.S. Appl. No. 18/833,272.

An Office Action issued by the Indian Patent Office on Jul. 28, 2026, which corresponds to Indian Patent Application No. 202447063649 and is related to U.S. Appl. No. 18/833,272.

* cited by examiner

| OID | OPW |
|---|---|

AUTHENTICATION SYSTEM, AUTHENTICATION MODULE, AND AUTHENTICATION PROGRAM

TECHNICAL FIELD

The present disclosure relates to an authentication system, an authentication module, and an authentication program.

BACKGROUND ART

Conventionally, there has been known a technology of performing authentication referred to as FIDO authentication at the time of communication between devices such as a client device and a server device that are communicatively connected to each other. In FIDO authentication, challenge & response authentication using a certificate with a public key is performed between a device that performs authentication and a device to be authenticated.

CITATION LIST

Patent Literature

Patent Literature 1: Japanese Patent Laid-Open No. 2021-150681

SUMMARY OF INVENTION

Technical Problem

However, in the conventional technology as described above, it is necessary to prepurchase and introduce a certificate issued from an certificate authority, which is likely to increase operational costs and efforts. In addition, even after the introduction of the certificate, it is necessary to manage the term of validity, deal with specification changes, security risks or incidents, and the like, which is likely to increase operational costs and efforts.

Thus, one of the problems to be solved by the present disclosure is to provide an authentication system, an authentication module, and an authentication program that can suppress the increase of operational costs and efforts.

Solution to Problem

An authentication system as another example of the present disclosure comprises a first authentication module and a second authentication module communicatively connected to each other, wherein the first authentication module includes: a first acquirer that acquires first authentication data in which first authentication information generated by first generation logic based on first identification information specific to the first authentication module and second identification information specific to the second authentication module and second authentication information generated by second generation logic based on the first authentication information, the first identification information and the second identification information are associated with each other; and a first controller that sends the first authentication information of the first authentication data to the second authentication module, and generates third authentication information as reference information by means of third generation logic based on the first authentication information of the first authentication data sent to the second authentication module and the second authentication information of the first authentication data associated with the first authentication information, and wherein the second authentication module includes: a second acquirer that acquires second authentication data having the same configuration as the first authentication data in which the first authentication information and the second authentication information are associated with each other; and a second controller that, when the first authentication information of the first authentication data is received from the first authentication module, generates the third authentication information by means of the third generation logic based on the first authentication information of the second authentication data that coincides with the first authentication information of the first authentication data received from the first authentication module and the second authentication information of the second authentication data associated with the first authentication information, and sends back the third authentication information or the third authentication information encrypted with first key information to the first authentication module as send-back information, and wherein when the send-back information is received from the second authentication module, the first controller performs authentication by comparing the send-back information and the reference information or comparing the send-back information decrypted with second key information corresponding to the first key information and the reference information, and determines whether or not to continue a communication session between the first authentication module and the second authentication module based on a result of the authentication.

In addition, an authentication module as another example of the present disclosure is an authentication module communicatively connected to another authentication module, comprising: a first acquirer that acquires first authentication data in which first authentication information generated by first generation logic based on first identification information specific to the authentication module and second identification information specific to the another authentication module and second authentication information generated by second generation logic based on the first authentication information, the first identification information and the second identification information are associated with each other; and a first controller that sends the first authentication information of the first authentication data to the another authentication module that acquires second authentication data having the same configuration as the first authentication data, and generates third authentication information as reference information by means of third generation logic based on the first authentication information of the first authentication data sent to the another authentication module and the second authentication information of the first authentication data associated with the first authentication information, and, when send-back information is received from the another authentication module that, when the first authentication information of the first authentication data is received from the authentication module, generates the third authentication information by means of the third generation logic based on the first authentication information of the second authentication data that coincides with the first authentication information of the first authentication data received from the authentication module and the second authentication information of the second authentication data associated with the first authentication information, and sends back the third authentication information or the third authentication information encrypted with first key information to the authentication module as the send-back information, performs authentication by comparing the send-back information and the reference information or comparing the send-back information decrypted with second key information corresponding to the first key information and the reference information, and determines whether or not to continue a communication session between the authentication module and the another authentication module based on a result of the authentication.

In addition, an authentication module as still another example of the present disclosure is an authentication module communicatively connected to another authentication module, comprising: a second acquirer that acquires second authentication data in which first authentication information generated by first generation logic based on first identification information specific to the another authentication module and second identification information specific to the authentication module and second authentication information generated by second generation logic based on the first authentication information, the first identification information and the second identification information are associated with each other; and a second controller that, when the first authentication information of the first authentication data is received from the another authentication module that acquires first authentication data having the same configuration as the second authentication data and generates third authentication information as reference information by means of third generation logic based on the first authentication information of the first authentication data and the second authentication information of the first authentication data associated with the first authentication information, generates third authentication information by means of the third generation logic based on the first authentication information of the second authentication data that coincides with the first authentication information of the first authentication data received from the another authentication module and the second authentication information of the second authentication data associated with the first authentication information, and sends back the third authentication information or the third authentication information encrypted with first key information as send-back information to the another authentication module that, when the send-back information is received, performs authentication by comparing the send-back information and the reference information or comparing the send-back information decrypted with second key information corresponding to the first key information and the reference information, and determines whether or not to continue a communication session between the authentication module and the another authentication module based on a result of the authentication.

In addition, an authentication program as still another example of the present disclosure is an authentication program for causing a computer comprising an authentication module communicatively connected to another authentication module to: acquire first authentication data in which first authentication information generated by first generation logic based on first identification information specific to the authentication module and second identification information specific to the another authentication module and second authentication information generated by second generation logic based on the first authentication information, the first identification information and the second identification information are associated with each other; send the first authentication information of the first authentication data to the another authentication module that acquires second authentication data having the same configuration as the first authentication data; generate third authentication information as reference information by means of third generation logic based on the first authentication information of the first authentication data sent to the another authentication module and the second authentication information of the first authentication data associated with the first authentication information; when send-back information is received from the another authentication module that, when the first authentication information of the first authentication data is received from the authentication module, generates the third authentication information by means of the third generation logic based on the first authentication information of the second authentication data that coincides with the first authentication information of the first authentication data received from the authentication module and the second authentication information of the second authentication data associated with the first authentication information, and sends back the third authentication information or the third authentication information encrypted with first key information to the authentication module as the send-back information, perform authentication by comparing the send-back information and the reference information or comparing the send-back information decrypted with second key information corresponding to the first key information and the reference information; and determine whether or not to continue a communication session between the authentication module and the another authentication module based on a result of the authentication.

In addition, an authentication program as still another example of the present disclosure is an authentication program for causing a computer comprising an authentication module communicatively connected to another authentication module to: acquire second authentication data in which first authentication information generated by first generation logic based on first identification information specific to the another authentication module and second identification information specific to the authentication module and second authentication information generated by second generation logic based on the first authentication information, the first identification information and the second identification information are associated with each other; when the first authentication information of the first authentication data is received from the another authentication module that acquires first authentication data having the same configuration as the second authentication data and generates third authentication information as reference information by means of third generation logic based on the first authentication information of the first authentication data and the second authentication information of the first authentication data associated with the first authentication information, generate third authentication information by means of the third generation logic based on the first authentication information of the second authentication data that coincides with the first authentication information of the first authentication data received from the another authentication module and the second authentication information of the second authentication data associated with the first authentication information; and send back the third authentication information or the third authentication information encrypted with first key information as send-back information to the another authentication module that, when the send-back information is received, performs authentication by comparing the send-back information and the reference information or comparing the send-back information decrypted with second key information corresponding to the first key information and the reference information, and determines whether or not to continue a communication session between the authentication module and the another authentication module based on a result of the authentication.

BRIEF DESCRIPTION OF DRAWINGS

FIG. 3 is an exemplary and schematic diagram showing a configuration of authentication data according to embodiments.

DESCRIPTION OF EMBODIMENTS

In the following, embodiments (and variations) of an authentication system, an authentication module, and an authentication program according to the present disclosure will be described on the basis of the drawings. The configurations of the embodiments described in the following and actions and effects resulted from the configurations are merely an example, and are not limited by the following description.

In addition, while ordinal numbers such as "first" and "second" are used when necessary in the present disclosure, these ordinal numbers are used for convenience of identification and do not indicate a specific order of priority.

EMBODIMENTS

Figure 1:
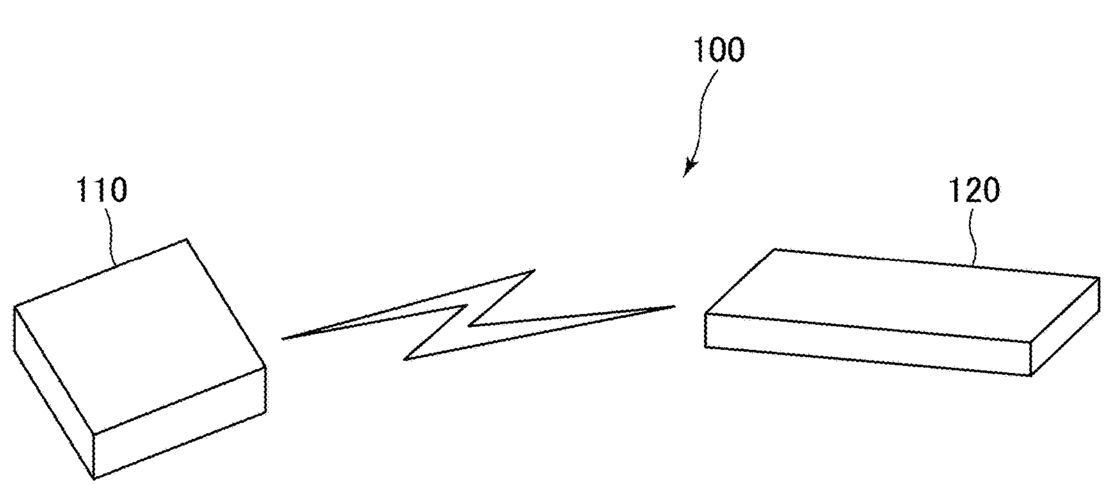
FIG. 1 is an exemplary and schematic diagram showing an authentication system according to embodiments.

FIG. 1 is an exemplary and schematic diagram showing an authentication system 100 according to embodiments.

As shown in FIG. 1, the authentication system 100 according to embodiments includes a client device 110 and a server device 120 communicatively connected to each other via a network (not shown). The client device 110 and the server device 120 are configured as authentication modules that perform authentication with each other at the time of communication.

Note that the configuration shown in FIG. 1 is merely an example. For example, although the authentication system 100 is shown in FIG. 1 in the simplest configuration in which the client device 110 and the server device 120 are provided in a one-to-one relationship, the client device 110 and the server device 120 may be in a many-to-one relationship or in a many-to-many relationship.

Here, a technology of performing authentication referred to as FIDO authentication has been known as a conventional technology for performing authentication between authentication modules such as the client device 110 and the server device 120 shown in FIG. 1. In FIDO authentication, challenge & response authentication using a certificate with a public key is performed between a device that performs authentication and a device to be authenticated.

However, in the conventional technology as described above, it is necessary to prepurchase and introduce a certificate issued from an certificate authority, which is likely to increase operational costs and efforts. In addition, even after the introduction of the certificate, it is necessary to manage the term of validity, deal with specification changes, security risks or incidents, and the like, which is likely to increase operational costs and efforts.

Thus, embodiments provide the client device 110 and the server device 120 as authentication modules with the functionalities shown in FIG. 2 below, thereby suppressing the increase of operational costs and efforts.

Figure 2:
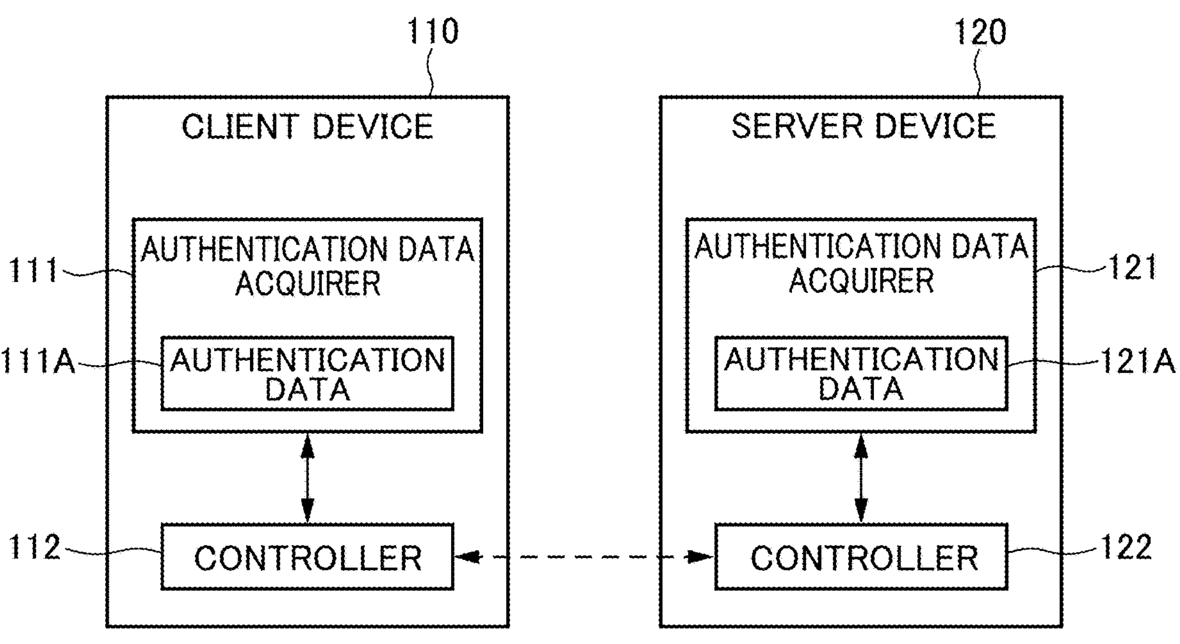
FIG. 2 is an exemplary and schematic block diagram showing a functional configuration of an edge server and a terminal as authentication modules according to embodiments.

FIG. 2 is an exemplary and schematic block diagram showing a functional configuration of the client device 110 and the server device 120 as authentication modules according to embodiments.

As shown in FIG. 2, the client device 110 includes an authentication data acquirer 111 and a controller 112, and the server device 120 includes an authentication data acquirer 121 and a controller 122.

The authentication data acquirer 111 of the client device 110 acquires authentication data 111A used for authentication with the server device 120. The authentication data acquirer 111 may acquire the authentication data 111A by generating the authentication data 111A by means of predetermined logic (the details of which will be described later) every time of authentication, or may acquire the authentication data 111A by receiving the authentication data 111A generated in advance by an external device from the external device, for example.

Similarly, the authentication data acquirer 121 of the server device 120 acquires authentication data 121A used for authentication with the client device 110. The authentication data acquirer 121 may acquire the authentication data 121A by generating the authentication data 121A by means of predetermined logic (the details of which will be described later) every time of authentication, or may acquire the authentication data 121A by receiving the authentication data 121A generated in advance by an external device from the external device, for example.

Here, in embodiments, the authentication data 111A on the client device 110 side and the authentication data 121A on the server device 120 side have the same configuration. More specifically, both the authentication data 111A and 121A have a configuration as shown in FIG. 3 below.

Figure 3:
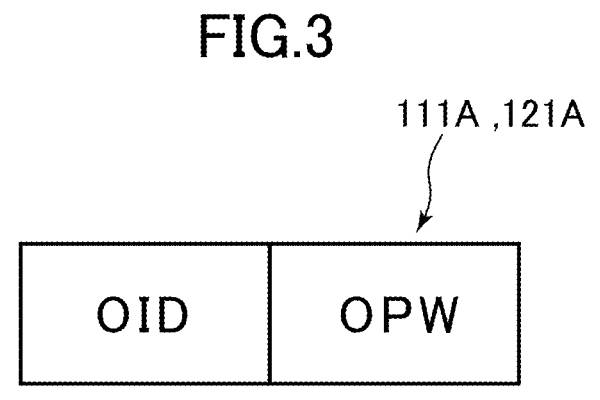

FIG. 3 is an exemplary and schematic diagram showing a configuration of the authentication data 111A and 121A according to embodiments.

As shown in FIG. 3, the authentication data 111A and 121A include an OID (one-time ID) and an OPW (one-time password) associated with each other. The OID is first authentication information generated by first generation logic on the basis of identification information specific to the client device 110 and identification information specific to the server device 120, and the OPW is second authentication information generated by second generation logic on the basis of the OID and the identification information of each of the client device 110 and the server device 120.

For example, the first generation logic according to embodiments is represented by equation (10) below using a pseudo-random function PRF( ) Note that, in embodiments, it is assumed that the pseudo-random function PRF( ) outputs a pseudo-random number with such a large number of digits that substantially no collision occurs.

$$OID = PRF(\text{secret, seed}) \tag{10}$$

In equation (10) above, secret is a value (for example, a hash value) based on the identification information specific to the client device 110 and the identification information specific to the server device 120. For example, in embodiments, a MAC address as address information of the client device 110 on the network is used as the identification information specific to the client device 110, and a MAC address as address information of the server device 120 on the network is used as the identification information specific to the server device 120. Therefore, if the MAC address of the client device 110 is "01-23-45-67-89-aa", for example, and the MAC address of the server device 120 is "01-23-45-67-89-ab", for example, secret is represented by equation (11) below using a hash function hash( ).

$$\text{secret} = hash(\text{“}01-23-45-67-89-aa + 01-23-45-67-89-ab\text{”}) \quad (11)$$

In addition, in equation (10) above, seed is variable information that changes in synchronization between the client device 110 and the server device 120 every time a communication session between the client device 110 and the server device 120 starts. More specifically, seed is counter information that varies (regularly increments or decrements) every time a communication session between the client device 110 and the server device 120 starts.

It can be seen from the above description that the first generation logic according to embodiments can generate a unique OID that differs for each communication session on the basis of MAC addresses as unique information that is independent of the communication session and counter information that varies for each communication session.

In addition, the second generation logic according to embodiments is represented by equation (20) below using an original function Pwlog( ) Note that, in embodiments, the original function Pwlog( ) is a hash function originally designed to output a hash value with such a large number of digits that substantially no collision occurs, for example.

$$OPW = Pw\text{log}(OID, \text{secret}) \quad (20)$$

In equation (20) above, OID and secret are the same as those appearing in equation (10) above. Therefore, it can be seen that the second generation logic according to embodiments can generate a unique OPW that differs for each communication session on the basis of a unique OID that differs for each communication session and counter information that varies for each communication session.

Figure 4:
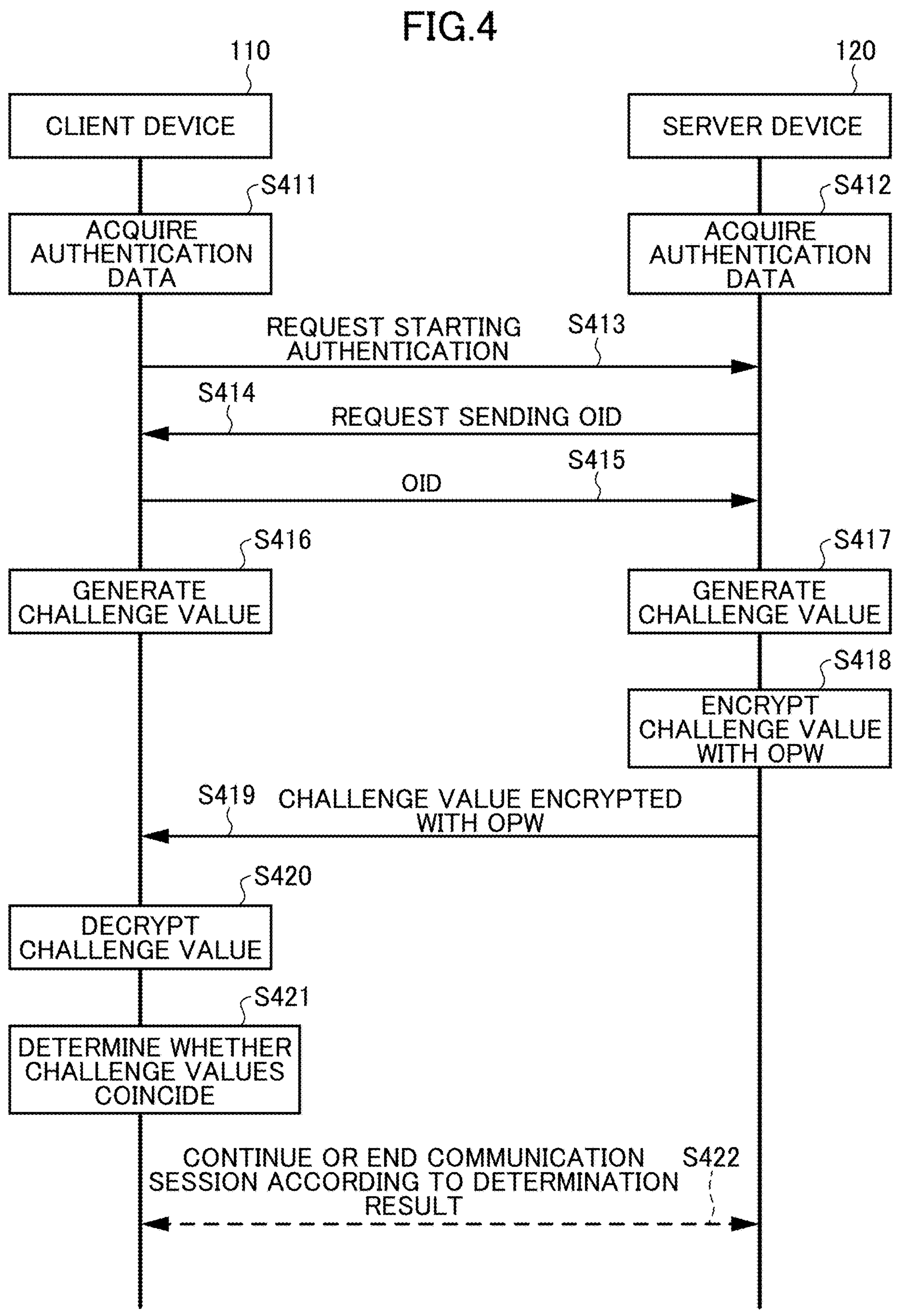
FIG. 4 is an exemplary and schematic sequence diagram showing an example of a flow of authentication performed by the authentication system according to embodiments.

Returning to FIG. 2, when a communication session between the client device 110 and the server device 120 starts, the controller 112 of the client device 110 and the controller 122 of the server device 120 perform authentication in a flow as shown in FIG. 4 below using the authentication data 111A and 121A described above, and determines whether or not to continue the current communication session on the basis of the result of the authentication.

FIG. 4 is an exemplary and schematic sequence diagram showing an example of a flow of authentication performed by the authentication system 100 according to embodiments.

In the example shown in FIG. 4, first, at step S411, the authentication data acquirer 111 of the client device 110 acquires the authentication data 111A including a pair of an OID and an OPW as described above. Similarly, at step S412, the authentication data acquirer 121 of the server device 120 acquires the authentication data 121A including a pair of an OID and an OPW as described above.

Then, at step S413, the controller 112 of the client device 110 requests the server device 120 to start authentication in order to start a communication session with the server device 120. Then, at step S414, the controller 122 of the server device 120 requests the client device 110 to send the OID.

Then, at step S415, the controller 112 of the client device 110 sends, to the server device 120, the OID of the authentication data 111A acquired at step S411. Then, at step S416, the controller 112 of the client device 110 generates a challenge value as reference information by using the authentication data 111A acquired at step S411. Note that the challenge value is a value generated by third generation logic on the basis of a value (for example, a hash value) based on the OID and a value (for example, a hash value) based on the OPW.

For example, if the value based on the OID is "43215678902" and the value based on the OPW is "23456432102", the third generation logic according to embodiments is represented by equation (30) below using a hash function hash( ).

$$\text{challenge value} = hash(\text{“}43215678902 + 23456432102\text{”}) \quad (30)$$

On the other hand, at step S417, the controller 122 of the server device 120 extracts, from the authentication data 121A acquired at step S412, an OID that coincides with the OID received from the client device 110 at step S415 and an OPW associated with the OID, and generates a challenge value separately from the client device 110 by means of third generation logic similar to that described above based on the extracted OID and OPW.

Then, at step S418, the controller 122 of the server device 120 encrypts the challenge value generated at step S417 with the OPW. The OPW used for encryption is the OPW associated with the OID that coincides with the OID received from the client device 110 at step S415, extracted from the authentication data 121A acquired at step S412.

Then, at step S419, the controller 122 of the server device 120 sends back, to the client device 110, the challenge value encrypted at step S418 as send-back information. Then, at step S420, the controller 112 of the client device 110 decrypts, with the OPW, the challenge value as the send-back information received from the server device 120 at step S419. The OPW used for decryption is the OPW associated with the OID sent to the server device 120 at step S415, extracted from the authentication data 111A acquired at step S411.

Then, at step S421, the controller 112 of the client device 110 determines whether or not the challenge value generated as the reference information at step S416 and the challenge value as the send-back information decrypted at the step S420 coincide with each other.

Then, at step S422, the controller 112 of the client device 110 continues or ends the current communication session according to the result of the determination at step S421. For example, if the result of the determination at step S421 shows coincidence, the controller 112 continues the current communication session, and if the result of the determination at step S421 shows no coincidence, the controller 112 ends the communication session. The authentication according to embodiments is performed in this manner.

Note that, although an example in which the communication session is started on the client device 110 side is shown in FIG. 4, the communication session may also be started on the server device 120 side in embodiments. In this case, the authentication may be performed such that the subjects of the processes from step S413 onward are reversed from the example shown in FIG. 4. Therefore, in embodiments, the controller 112 of the client device 110 and the controller 122 of the server device 120 may have equivalent functionalities to each other.

As described above, the authentication system 100 according to embodiments includes the client device 110 and the server device 120 as authentication modules (a first authentication module and a second authentication module) communicatively connected each other. Although in the following description, the client device 110 corresponds to the first authentication module and the server device 120 corresponds to the second authentication module, this is merely for simplicity of description. The following description is similarly applicable even in a case where the server device 120 corresponds to the first authentication module and the client device 110 corresponds to the second authentication module.

The client device 110 as the first authentication module includes the authentication data acquirer 111 as a first acquirer. The authentication data acquirer 111 acquires the authentication data 111A as first authentication data in which an OID as first authentication information and an OPW as second authentication information are associated with each other. The OID is generated by the first generation logic on the basis of first identification information specific to the client device 110 and second identification information specific to the server device 120 as the second authentication module, and the OPW is generated by the second generation logic on the basis of the OID, the first identification information and the second identification information.

In addition, the client device 110 includes the controller 112 as a first controller. The controller 112 sends the OID of the authentication data 111A to the server device 120, and generates a challenge value as third authentication information by means of the third generation logic on the basis of the OID of the authentication data 111A sent to the server device 120 and the OPW of the authentication data 111A associated with the OID. Note that the challenge value generated here can be represented as reference information.

In addition, the server device 120 includes the authentication data acquirer 121 as a second acquirer and the controller 122 as a second controller. The authentication data acquirer 121 acquires the authentication data 121A as second authentication data having the same configuration as the authentication data 111A described above, in which an OID and an OPW are associated with each other. In addition, when the OID of the authentication data 111A is received from the client device 110, the controller 122 generates a challenge value by means of the third generation logic described above on the basis of the OID of the authentication data 121A that coincides with the OID of the authentication data 111A received from the client device 110 and the OPW of the authentication data 121A associated with the OID, and sends back, to the client device 110 as send-back information, the challenge value encrypted by using the OPW of the authentication data 121A as first key information.

Here, in embodiments, when the send-back information is received from the server device 120, the controller 112 of the client device 110 decrypts the send-back information by using the OPW of the authentication data 111A associated with the OID sent to the server device 120 as second key information corresponding to the first key information, performs authentication by comparing the decrypted send-back information and the above-described reference information, and determines whether or not to continue the communication session with the server device 120 on the basis of the result of the authentication.

According to the above-described configuration, authentication equivalent to FIDO authentication can be performed between the client device 110 and the server device 120 by using the challenge value generated on the basis of the OID and the OPW, which are relatively simple information, without the use of a certificate. This can suppress the increase of operational costs and efforts due to the use of a certificate.

In addition, in embodiments, the client device 110 and the server device 120 are communicatively connected to each other via a network. The first identification information and the second identification information are each address information for identifying the client device 110 and the server device 120 on the network.

According to the above-described configuration, the first identification information and the second identification information can be easily configured by using the address information.

In addition, in embodiments, an OID is generated further on the basis of variable information that changes in synchronization between the client device 110 and the server device 120 every time a communication session between the client device 110 and the server device 120 starts.

In the above-described configuration, it is possible to easily generate a different OID for each communication session by using the variable information. In this manner, even if an OID is leaked in a communication session, the leaked OID cannot be used in other communication sessions. As a result, it is possible to improve security, unlike conventional FIDO authentication, in which, once a key associated with a certificate is leaked, security is deteriorated until the certificate is updated.

Here, in embodiments, the variable information includes counter information that varies every time a communication session between the client device 110 and the server device 120 starts.

In the above-described configuration, the variable information can be easily configured by using the counter information.

In addition, in embodiments, the first generation logic includes generating an OID on the basis of a pseudo-random number obtained by inputting a value based on at least the first identification information and the second identification information to the pseudo-random function PRF( ) (see equation (10) and equation (11) above).

According to the above-described configuration, it is possible to easily generate a unique OID by using the pseudo-random function.

In addition, in embodiments, the second generation logic includes generating an OPW on the basis of a first hash value obtained by inputting the OID and a value based on the first identification information and the second identification information to the original function Pwlog( ) as a first hash function (see equation (20) above).

According to the above-described configuration, it is possible to easily generate a unique OPW by using the first hash function.

In addition, in embodiments, the third generation logic includes generating a challenge value on the basis of a second hash value obtained by inputting a value (for example, a hash value) based on the OID and a value (for example, a hash value) based on the second authentication information to the hash function hash( ) as a second hash function (see equation (30) above).

According to the above-described configuration, it is possible to easily generate a unique challenge value by using the second hash function.

Finally, the hardware configuration of authentication modules (the client device 110 and the server device 120) according to the above-described embodiments will be described. An authentication module according to the embodiments is configured as a computer 500 having a hardware configuration as shown in FIG. 5 below, for example.

Figure 5:
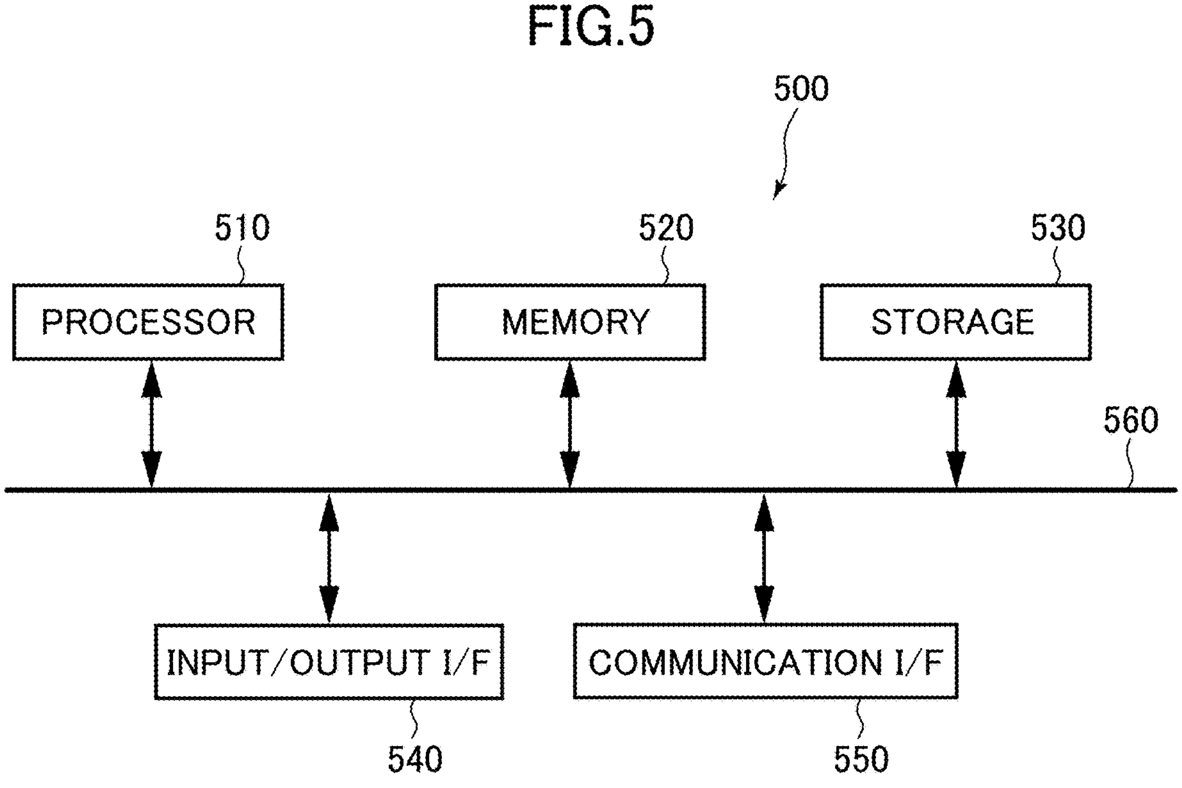
FIG. 5 is an exemplary and schematic block diagram showing a hardware configuration of a computer that constitutes an authentication module according to embodiments.

FIG. 5 is an exemplary and schematic block diagram showing a hardware configuration of a computer 500 that constitutes an authentication module according to embodiments.

As shown in FIG. 5, the computer 500 comprises a processor 510, a memory 520, a storage 530, an input/output interface (I/F) 540, and a communication interface (I/F) 550. These hardware components are connected to a bus 560.

The processor 510 is configured as a CPU (Central Processing Unit), for example, and collectively controls the operations of units of the computer 500.

The memory 520 includes a ROM (Read Only Memory) and a RAM (Random Access Memory), for example, and realizes volatile or non-volatile storage of various pieces of data such as programs executed by the processor 510, provision of workspaces for the processor 510 to execute the programs, and the like.

The storage 530 includes an HDD (Hard Disk Drive) or an SSD (Solid State Drive), for example, and stores various pieces of data in a non-volatile manner.

The input/output interface 540 controls the input of data from input devices (not shown) such as a keyboard and a mouse to the computer 500, for example, and the output of data from the computer 500 to output devices (not shown) such as a display and a speaker, for example.

The communication interface 550 enables the computer 500 to perform communication with other devices.

The functional configuration that the client device 110 and the server device 120 as authentication modules according to embodiments have (see FIG. 2) is realized as a group of functional modules by the cooperation of hardware and software as a result of the processor 510 executing an authentication program stored in advance in the memory 520 or storage 530. However, in embodiments, some or all of the group of functional modules shown in FIG. 2 may be realized only by hardware such as specially-designed circuitry.

Note that the authentication program described above does not necessarily need to be stored in advance in the memory 520 or storage 530. For example, the above-described authentication program may also be provided as a computer program product recorded in a installable or executable format in a computer-readable medium such as various magnetic disks such as a flexible disk (FD) or various optical disks such as a DVD (Digital Versatile Disk).

In addition, the authentication program described above may also be provided or distributed via a network such as the Internet. That is, the authentication program described above may also be stored on a computer connected to a network such as the Internet and provided by accepting downloads via the network.

<Variations>

In the above-described embodiments, a configuration is exemplified in which the authentication modules are the client device 110 and the server device 120 as separate pieces of electronic equipment communicatively connected via a network. However, an "authentication module" of the present disclosure is a concept that can include not only a physical configuration such as electronic equipment, but also a logical configuration such as a software application. Therefore, the technology of the present disclosure is also applicable to authentication between applications loaded on one piece of electronic equipment. In this case, an OID can be generated on the basis of specific identification information (and variable information) for identifying the applications, and an OPW can be generated on the basis of the OID and the specific identification information for identifying the applications. The specific identification information for identifying the applications includes, for example, a license number assigned to each application and the like.

In addition, in the above-described embodiments, a configuration is exemplified in which address information for identifying the authentication module on the network is used as identification information specific to an authentication module. However, in the present disclosure, the identification information may also be information that is arbitrarily and uniquely determined by a user, for example, other than the address information, as long as it is information that can identify the authentication module.

In addition, in the above-described embodiments, a configuration is exemplified in which counter information that regularly increments or decrement is used as variable information that changes in synchronization between authentication modules every time a communication session starts. However, in the present disclosure, the variable information may also be information that is different from the counter information and does not regularly vary as long as it is information that changes in synchronization between the authentication modules every time a communication session starts.

In addition, in the above-described embodiments, the first generation logic that uses a pseudo-random function and the second generation logic and the third generation logic that use hash functions are exemplified. However, in the present disclosure, the first generation logic does not necessarily need to be logic that uses a pseudo-random function as long as it is logic that can generate a unique OID. Similarly, the second generation logic does not necessarily need to be logic that uses a hash function as long as it is logic that can generate a unique OPW associated with an OID, and the third generation logic does not necessarily need to be logic that uses a hash function as long as it is logic that can generate a unique challenge value based on a value based on the OID and a value based on the OPW.

In addition, in the above-described embodiments, a configuration is exemplified in which the encryption/decryption of the challenge value is performed by using an OPW. However, the technology of the present disclosure can include a configuration in which the encryption/decryption of the challenge value is performed by using key information other than the OPW.

For example, the technology of the present disclosure can include configuration in which variable information (for example, counter information) that changes in synchronization between the client device 110 and the server device 120 every time a communication session between the client device 110 and the server device 120 starts is used as key information for the encryption/decryption of the challenge value. In this configuration, the send-back information is the challenge value encrypted by using the variable information as the first key information, and the authentication is authentication by comparing the send-back information decrypted by using the same variable information as the second key information and the reference information.

In addition, the technology of the present disclosure can include a configuration in which fixed information that is independent of the communication session and does not change is used as the key information for the encryption/decryption of the challenge value. In this configuration, the send-back information is the challenge value encrypted by using fixed information based on the first identification information and the second identification information (for example, the sum of the first identification information and the second identification information) as the first key information, and the authentication is authentication by comparing the send-back information decrypted by using the same fixed information as the second key information and the reference information.

Further, the technology of the present disclosure can include a configuration in which the encryption/decryption of the challenge value is not performed. In this configuration, the send-back information is the challenge value itself, and the authentication is authentication by directly comparing the send-back information and the reference information. Since such a configuration has a point in common with the above-described embodiments in that a certificate is not required, it is possible to suppress the increase of operational costs and efforts, similarly to the above-described embodiments.

Although some embodiments and variations of the present disclosure have been described above, these embodiments and variations are presented by way of example and not intended to limit the scope of the invention. These novel embodiments and variations can be implemented in other different forms, and various omissions, replacements and modifications can be made without departing from the spirit of the invention. These embodiments and variations fall within the scope and spirit of the invention and within the scope of the invention defined in the claims and its equivalents.

REFERENCE SIGNS LIST

100 authentication system
110 client device (authentication module, first authentication module)
120 server device (authentication module, second authentication module)
111 authentication data acquirer (first acquirer)
111A authentication data (first authentication data)
112 controller (first controller)
121 authentication data acquirer (second acquirer)
121A authentication data (second authentication data)
122 controller (second controller)

The invention claimed is:

1. An authentication system comprising a client device including a first processor configured to control execution of a first authentication module and a server device including a second processor configured to control execution of a second authentication module, the client device communicatively connected to the server device, wherein the first authentication module is configured to:

acquire first authentication data in which first authentication information and second authentication information are associated with each other, the first authentication information being generated by first generation logic based on first identification information specific to the first authentication module and second identification information specific to the second authentication module, the second authentication information being generated by second generation logic based on the first authentication information; and send the first authentication information of the first authentication data to the second authentication module, and to generate third authentication information as reference information by means of third generation logic based on the first authentication information of the first authentication data, which is sent to the second authentication module, and the second authentication information of the first authentication data associated with the first authentication information, wherein the second authentication module is configured to:

acquire second authentication data having the same configuration as the first authentication data in which the first authentication information and the second authentication information are associated with each other; and when the first authentication information of the first authentication data is received from the first authentication module, generate the third authentication information by means of the third generation logic based on the first authentication information of the second authentication data, which coincides with the first authentication information of the first authentication data received from the first authentication module, and the second authentication information of the second authentication data associated with the first authentication information, and to send back the third authentication information or the third authentication information encrypted with first key information to the first authentication module as send-back information, and wherein when the send-back information is received from the second authentication module, the first authentication module is configured to perform authentication by comparing the send-back information and the reference information or comparing the send-back information decrypted with second key information corresponding to the first key information and the reference information, and to determine whether or not to continue a communication session between the first authentication module and the second authentication module based on a result of the authentication.

2. The authentication system according to claim 1, wherein the send-back information is the third authentication information encrypted by using, as the first key information, the second authentication information of the second authentication data associated with the first authentication information of the second authentication data, which coincides with the first authentication information of the first authentication data sent from the first authentication module to the second authentication module, and the authentication is authentication by comparing the send-back information decrypted by using, as the second key information, the second authentication information of the first authentication data associated with the first authentication information of the first authentication data sent from the first authentication module to the second authentication module and the reference information.

3. The authentication system according to claim 1, wherein the send-back information is the third authentication information encrypted by using, as the first key information, variable information which changes in synchronization between the first authentication module and the second authentication module every time the communication session between the first authentication module and the second authentication module starts, and the authentication is authentication by comparing the send-back information decrypted by using the variable information as the second key information and the reference information.

4. The authentication system according to claim 1, wherein the send-back information is the third authentication information encrypted by using, as the first key information, fixed information based on the first identification information and the second identification information, and the authentication is authentication by comparing the send-back information decrypted by using the fixed information as the second key information and the reference information.

5. The authentication system according to claim 1, wherein the first authentication module and the second authentication module are communicatively connected to each other via a network, and the first identification information and the second identification information respectively include information for identifying the first authentication module and the second authentication module on the network.

6. The authentication system according to claim 1, wherein the first authentication information is generated further based on variable information that changes in synchronization between the first authentication module and the second authentication module every time the communication session between the first authentication module and the second authentication module starts.

7. The authentication system according to claim 6, wherein the variable information includes counter information that varies every time the communication session between the first authentication module and the second authentication module starts.

8. The authentication system according to claim 1, wherein the first generation logic includes generating the first authentication information based on a pseudo-random number obtained by inputting a value based on at least the first identification information and the second identification information to a pseudo-random function.

9. The authentication system according to claim 1, wherein the second generation logic includes generating the second authentication information based on a first hash value obtained by inputting the first authentication information and a value based on the first identification information and the second identification information to a first hash function.

10. The authentication system according to claim 1, wherein the third generation logic includes generating the third authentication information based on a second hash value obtained by inputting a value based on the first authentication information and a value based on the second authentication information to a second hash function.

11. A non-transitory computer-readable media in which an authentication program is recorded, the authentication program causing a computer comprising an authentication module communicatively connected to another authentication module to:

acquire first authentication data in which first authentication information and second authentication information are associated with each other, the first authentication information being generated by first generation logic based on first identification information specific to the authentication module and second identification information specific to the another authentication module, the second authentication information being generated by second generation logic based on the first authentication information;

send the first authentication information of the first authentication data to the another authentication module which acquires second authentication data having the same configuration as the first authentication data;

generate third authentication information as reference information by means of third generation logic based on the first authentication information of the first authentication data, which is sent to the another authentication module, and the second authentication information of the first authentication data associated with the first authentication information;

when send-back information is received from the another authentication module, perform authentication by comparing the send-back information and the reference information or comparing the send-back information decrypted with second key information corresponding to the first key information and the reference information, wherein, when the first authentication information of the first authentication data is received from the authentication module, the another authentication module generates the third authentication information by means of the third generation logic based on the first authentication information of the second authentication data, which coincides with the first authentication information received from the authentication module, and the second authentication information of the second authentication data associated with the first authentication information, and the another authentication module sends back the third authentication information or the third authentication information encrypted with first key information to the authentication module as the send-back information; and determine whether or not to continue a communication session between the authentication module and the another authentication module based on a result of the authentication.

12. The non-transitory computer-readable media according to claim 11, wherein the send-back information is the third authentication information encrypted by using, as the first key information, the second authentication information of the second authentication data associated with the first authentication information of the second authentication data that coincides with the first authentication information of the first authentication data sent from one of the authentication module and the another authentication module to the other, and the authentication is authentication by comparing the send-back information decrypted by using, as the second key information, the second authentication information of the first authentication data associated with the first authentication information of the first authentication data sent from one of the authentication module and the another authentication module to the other and the reference information.

13. The non-transitory computer-readable media according to claim 11, wherein the send-back information is the third authentication information encrypted by using, as the first key information, variable information that changes in synchronization between the authentication module and the another authentication module every time the communication session between the authentication module and the another authentication module starts, and the authentication is authentication by comparing the send-back information decrypted by using the variable information as the second key information and the reference information.

14. The non-transitory computer-readable media according to claim 11, wherein the send-back information is the third authentication information encrypted by using, as the first key information, fixed information based on the first identification information and the second identification information, and the authentication is authentication by comparing the send-back information decrypted by using the fixed information as the second key information and the reference information.

15. The non-transitory computer-readable media according to claim 11, wherein the authentication module and the another authentication module are communicatively connected via a network, and the first identification information and the second identification information respectively include information for identifying the authentication module and the another authentication module on the network.

16. The non-transitory computer-readable media according to claim 11, wherein the first authentication information is generated further based on variable information that changes in synchronization between the authentication module and the another authentication module every time the communication session between the authentication module and the another authentication module starts.

17. The non-transitory computer-readable media according to claim 16, wherein the variable information includes counter information that varies every time the communication session between the authentication module and the another authentication module starts.

18. The non-transitory computer-readable media according to claim 11, wherein the first generation logic includes generating the first authentication information based on a pseudo-random number obtained by inputting a value based on at least the first identification information and the second identification information to a pseudo-random function.

19. The non-transitory computer-readable media according to claim 11, wherein the second generation logic includes generating the second authentication information based on a hash value obtained by inputting the first authentication information and a value based on the first identification information and the second identification information to a hash function.

20. A non-transitory computer-readable media in which an authentication program is recorded, the authentication program causing a computer comprising an authentication module communicatively connected to another authentication module to:

acquire second authentication data in which first authentication information and second authentication information are associated with each other, the first authentication information being generated by first generation logic based on first identification information specific to the another authentication module and second identification information specific to the authentication module, the second authentication information being generated by second generation logic based on the first authentication information;

when the first authentication information of the first authentication data is received from the another authentication module, generate third authentication information by means of the third generation logic based on the first authentication information of the second authentication data which coincides with the first authentication information of the first authentication data received from the another authentication module and the second authentication information of the second authentication data associated with the first authentication information, wherein the another authentication module acquires first authentication data having the same configuration as the second authentication data and generates third authentication information as reference information by means of third generation logic based on the first authentication information of the first authentication data and the second authentication information of the first authentication data associated with the first authentication information; and send back the third authentication information or the third authentication information encrypted with first key information as send-back information to the another authentication module, wherein the another authentication module performs, when the send-back information is received, authentication by comparing the send-back information and the reference information or comparing the send-back information decrypted with second key information corresponding to the first key information and the reference information, and determines whether or not to continue a communication session between the authentication module and the another authentication module based on a result of the authentication.

* * * * *